(12) United States Patent
Nakano et al.

(10) Patent No.: US 11,534,866 B2
(45) Date of Patent: Dec. 27, 2022

(54) LASER PEENING PROCESSING APPARATUS

(71) Applicant: SUBARU CORPORATION, Tokyo (JP)

(72) Inventors: Mayu Nakano, Tokyo (JP); Takafumi Adachi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 384 days.

(21) Appl. No.: 16/721,557

(22) Filed: Dec. 19, 2019

(65) Prior Publication Data

US 2020/0139489 A1 May 7, 2020

Related U.S. Application Data

(63) Continuation of application No. PCT/JP2018/014453, filed on Apr. 4, 2018.

(30) Foreign Application Priority Data

Jul. 27, 2017 (JP) .............................. JP2017-145914

(51) Int. Cl.
*B23K 26/356* (2014.01)
*B23K 26/12* (2014.01)
*B23K 26/0622* (2014.01)

(52) U.S. Cl.
CPC .......... *B23K 26/356* (2015.10); *B23K 26/128* (2013.01); *B23K 26/0622* (2015.10)

(58) Field of Classification Search
CPC ....................... B23K 26/0622; B23K 26/0624; B23K 26/12; B23K 26/128; B23K 26/1476;
(Continued)

(56) References Cited

U.S. PATENT DOCUMENTS

2016/0237521 A1 8/2016 Zhang

FOREIGN PATENT DOCUMENTS

JP 2010-247213 A 11/2010
JP 2004-160463 A 6/2014
(Continued)

OTHER PUBLICATIONS

Translation of Cited WO2015008482 (Year: 2015).*
(Continued)

*Primary Examiner* — Dana Ross
*Assistant Examiner* — Joseph W Iskra
(74) *Attorney, Agent, or Firm* — McGinn I.P. Law Group, PLLC.

(57) ABSTRACT

According to one implementation, a laser peening processing apparatus includes a laser oscillator and an irradiation system. The laser oscillator oscillates a laser light. The irradiation system condenses the laser light with a lens and irradiates a workpiece with the condensed laser light. The irradiation system irradiates the workpiece with the laser light in a state where the workpiece has been exposed in an atmosphere without interposed liquid. Furthermore, according to one implementation, a laser peening processing method includes producing a product or a semi-product by laser peening processing of the workpiece using the above-mentioned laser peening processing apparatus.

20 Claims, 4 Drawing Sheets

(58) Field of Classification Search
CPC .... B23K 26/16; B23K 26/356; B23K 37/006; B29C 2049/001; B29C 33/3842; B29C 33/42; B29C 49/0005; B29C 49/04; B29C 49/06; B29C 49/22; B29C 49/221; B29K 2023/06; B29K 2105/0005; B29K 2995/0022; B29K 2995/0073; B29L 2031/7158; B65B 3/022; B65D 1/0207; B65D 1/0215
USPC .................................................... 219/121.85
See application file for complete search history.

(56) References Cited

FOREIGN PATENT DOCUMENTS

| | | |
|---|---|---|
| JP | 2014-176870 A | 9/2014 |
| JP | 2015-093284 A | 5/2015 |
| JP | 2016-538421 A | 12/2016 |
| WO | WO 2015/008482 A1 | 1/2015 |
| WO | WO 2017/071907 A1 | 5/2017 |

OTHER PUBLICATIONS

Chinese Office Action, dated May 18, 2021, in Chinese Application No. 201880038036.5 and English Translation thereof.
Japanese Office Action, dated Jul. 30, 2020, in Japanese Application No. 2019-532376 and English Translation thereof.
Extended European Search Report dated Mar. 26, 2021 for European Patent Application No. 18838351.7-1016.
Sano Tomokazu et al: "Femtosecond laser peening of 2024 aluminum alloy without a sacrificial overlay under atmospheric conditions", Journal of Laser Applications, Laser Institute of America, US, vol. 29, No. 1, Nov. 7, 2016 (Nov. 7, 2016).
International Search Report (ISR) (PCT Form PCT/ISA/210), in PCT/JP2018/014453, dated Jun. 19, 2018.
Notification of Transmittal of Translation of the International Preliminary Report on Patentability (PCT Form PCT/IB/338), in PCT/JP2018/014453, dated Feb. 6, 2020.

* cited by examiner

LASER PEENING PROCESSING APPARATUS

CROSS REFERENCES TO RELATED APPLICATIONS

This is a continuation of Application PCT/JP2018/14453, filed on Apr. 4, 2018.

This application is based upon and claims the benefit of priority from Japanese Patent Application No. 2017-145914, filed on Jul. 27, 2017; the entire contents of which are incorporated herein by reference.

FIELD

Implementations described herein relate generally to a laser peening processing apparatus and a laser peening processing method.

BACKGROUND

Conventionally, laser peening processing is known as a method of modifying property of a surface of an object by giving residual stress on the surface of the object. Typical laser peening processing is performed by irradiating a surface to be processed of a workpiece with a focused laser beam in a state where the surface to be processed is covered with liquid. When a focused laser beam is radiated on a surface to be processed of a workpiece covered with liquid, plasma which is generated by the irradiation of the laser beam can be confined in the liquid. As a result, pressure of a shock wave is applied to the surface to be processed. Thereby, compression stress generated inside the workpiece can be made to remain as residual stress.

As a concrete example, a handheld laser peening processing apparatus which can supply water to a cylindrical object whose diameter is 40 mm and length is 200 mm has been proposed so that laser peening processing can be performed without immersing a workpiece in water (for example, refer to Japanese Patent Application Publication JP2010-247213). Meanwhile, a device which irradiates a pulse laser through a covering member having a solid transparent layer while sliding the covering member has been also proposed so that laser peening processing can be performed without a liquid (for example, refer to Japanese Patent Application Publication JP2014-176870).

An object of the present invention is to reduce restriction in working environment required for laser peening processing.

SUMMARY OF THE INVENTION

In general, according to one implementation, a laser peening processing apparatus includes a laser oscillator and an irradiation system. The laser oscillator oscillates a laser light. The irradiation system condenses the laser light with a lens and irradiates a workpiece with the condensed laser light. The irradiation system irradiates the workpiece with the laser light in a state where the workpiece has been exposed in an atmosphere without interposed liquid.

Further, according to one implementation, a laser peening processing method includes producing a product or a semi-product by laser peening processing of the workpiece using the above-mentioned laser peening processing apparatus.

DETAILED DESCRIPTION

A laser peening processing apparatus and a laser peening processing method according to implementations of the present invention will be described with reference to the accompanying drawings.
(Structure and Function)

Figure 1:
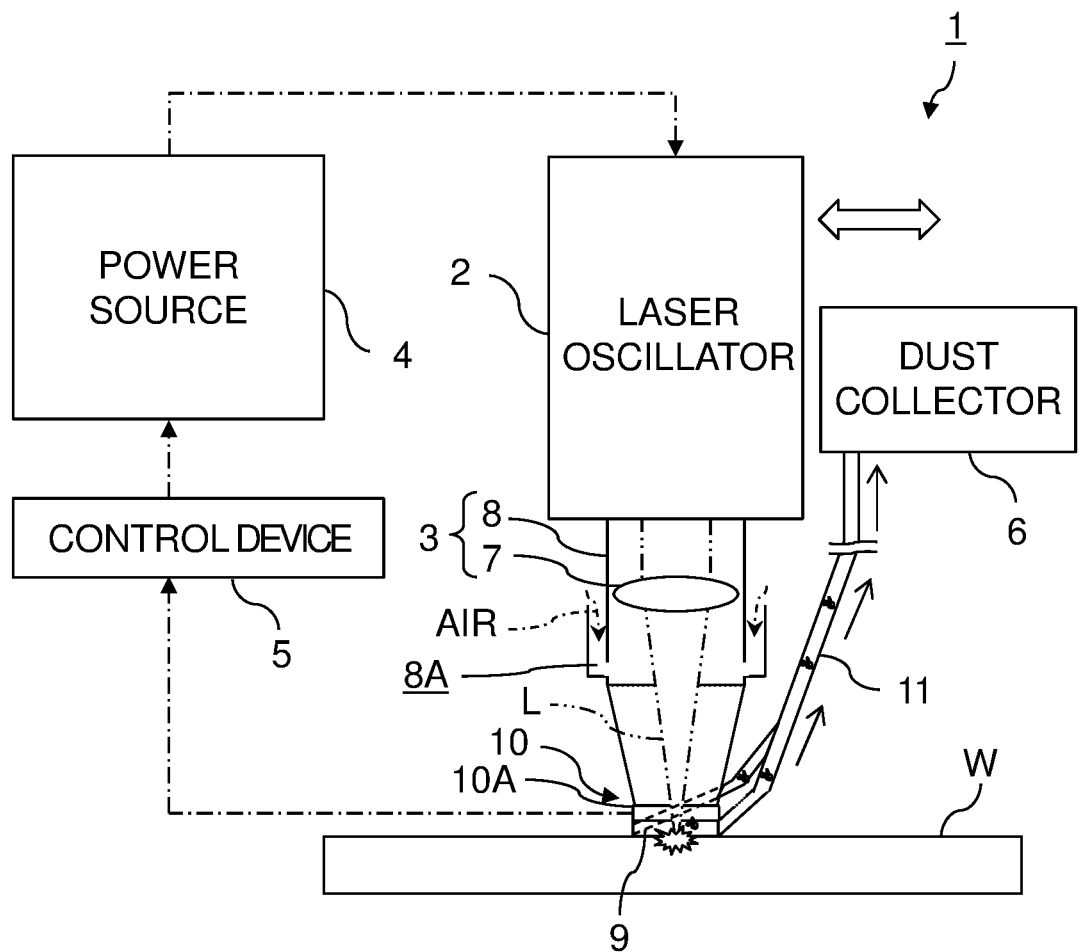
FIG. 1 shows a structure of a laser peening processing apparatus according to an implementation of the present invention.

FIG. 1 shows a structure of a laser peening processing apparatus according to an implementation of the present invention.

A laser peening processing apparatus 1 performs laser peening processing of a workpiece W in a state where the workpiece W has been exposed to the atmosphere with no interposed liquid. For that purpose, the laser peening processing apparatus 1 includes a laser oscillator 2, an irradiation system 3, a power source 4, a control device 5 and a dust collector 6. The laser oscillator 2 oscillates a laser light L. The irradiation system 3 irradiates the workpiece W with the laser light L. The power source 4 supplies electric power to the laser oscillator 2. The control device 5 controls the power source 4. The dust collector 6 collects dust of the workpiece W arisen due to laser peening processing.

The irradiation system 3 is configured to irradiate the workpiece W, which has been exposed to the atmosphere, with the laser light L, which has not passed through liquid. Therefore, the irradiation system 3 can have a simple structure which has a lens 7 disposed inside a nozzle 8. The lens 7 is an optical element for condensing the laser light L oscillated by the laser oscillator 2 and irradiating the workpiece W.

In order to perform laser peening processing of the workpiece W exposed to the atmosphere, the laser light L needs to have a sufficient intensity. An intensity I of a pulse laser is expressed by I=E/(S×t) wherein E is a pulse energy, S is an area of a beam spot with which the pulse laser is irradiated, and t is a pulse width. Therefore, the smaller the pulse width t becomes, the larger the pulse laser intensity I becomes, even when the pulse energy E is constant.

A picosecond laser and a femtosecond laser whose pulse widths t are each not more than a few picoseconds are each called an ultrashort pulse. In particular, a femtosecond laser whose pulse width t is a femtosecond (one quadrillionth of a second) order, out of ultrashort pulses, has a sufficient intensity I to perform laser peening processing of the workpiece W in the atmosphere without an interposed liquid, such as water, unlike a nanosecond laser, such as an Nd:YAG laser.

Accordingly, it is practical to compose the laser oscillator 2 of a femtosecond laser oscillator which oscillates a femtosecond laser as the laser light L. Alternatively, the laser oscillator 2 may be composed of a picosecond laser oscillator when the pulse laser intensity I required for laser peening processing is small. An object of laser peening processing is a metal, such as aluminum, iron or titanium, which plastically deforms. Therefore, the pulse laser intensity I required for laser peening processing is determined depending on a material to be an object of the laser peening processing. Hereinafter, a case where the laser oscillator 2 is composed of a femtosecond laser oscillator will be described mainly.

A conventional nanosecond laser oscillator which oscillates an Nd:YAG laser or the like is a large sized oscillator of which length is about 1 m and weight is about 50 kg. Therefore, in order to use a nanosecond laser oscillator for laser peening processing, it is practical to fix the nanosecond laser oscillator and move a workpiece with holding the workpiece by a robot or the like.

On the other hand, length of a femtosecond laser oscillator is about 600 mm. Therefore, using a femtosecond laser oscillator makes it possible to make the laser peening processing apparatus 1 be a handheld device by a worker. Specifically, it becomes practical for a worker to manually move the laser oscillator 2, to which the irradiation system 3 including the lens 7 and the nozzle 8 has been coupled, in order to perform laser peening processing of the workpiece W. Alternatively, it also becomes practical to attach the laser oscillator 2, to which the irradiation system 3 has been coupled, to an arm of a robot in order to perform laser peening processing with moving the irradiation system 3.

Accordingly, even when the workpiece W is a large-sized one like an aircraft structural object, laser peening processing can be performed by easily turning the nozzle 8 toward the workpiece W. That is, laser peening processing can be performed easily even in a state where the workpiece W have been fixed.

Moreover, when the laser oscillator 2 is composed of a femtosecond laser oscillator or the like, a liquid, such as water, or coating becomes unnecessary for laser peening processing, as mentioned above. Therefore, equipment for supplying a liquid, which has been necessary for laser peening processing using a nanosecond laser oscillator, becomes unnecessary.

On the other hand, it becomes important to secure safety since an intensity of the laser light L is large in a case where the laser peening processing apparatus 1 includes a femtosecond laser oscillator. Specifically, it is important to shield the laser light L so as to prevent a scattering light of the laser light L as well as the laser light L from entering an eye of a worker. In particular, when the laser peening processing apparatus 1 is a portable type, the tip of the nozzle 8 may be turned in various directions. Therefore, it is essential to prevent the laser light L from directly entering an eye of a person.

Accordingly, in order to shield scattering lights of the laser light L, the nozzle 8 can be composed of a tubular light shielding member. Examples of shading material include lightweight aluminum. Then, one open end of the nozzle 8 can be coupled to the laser oscillator 2. Meanwhile, an elastic body 9 which is made to contact with and slide on the surface of the workpiece W can be attached to the other open end of the nozzle 8.

Thereby, the optical path of the laser light L, including a point to be processed by laser peening processing, can be completely closed by the nozzle 8. As a result, an accident that a scattering light of the laser light L as well as the laser light L enters an eye of a worker can be prevented. Furthermore, damage on the workpiece W can be avoided since the elastic body 9 is attached to the tip of the nozzle 8 in the workpiece W side. That is, the laser light L, reflected lights, and scattering lights can be shut in the nozzle 8 without damaging the workpiece W.

When the laser light L is irradiated in a state where a gap has been generated between the workpiece W and the elastic body 9, a scattering light or a reflected light of the laser light L may leak from the gap. Thus, a sensor 10 which detects a contact state of the elastic body 9 with the workpiece W can be included in the laser peening processing apparatus 1.

Practical examples of the sensor 10 which detects a contact state between the elastic body 9 and the workpiece W include a pressure sensor and an optical position sensor. When an optical position sensor is used, for example, it can be detected whether the elastic body 9 has closely contacted with the surface of the workpiece W by detecting a distance from the surface of the workpiece W to the elastic body 9. Meanwhile, when a pressure sensor 10A is used as illustrated, it can be detected whether the elastic body 9 has contacted with the surface of the workpiece W by detecting a pressure applied on the elastic body 9 from the surface of the workpiece W.

Since the nozzle 8 is tubular, a structure of the elastic body 9 preferable to completely prevent generation of a gap between the elastic body 9 and the workpiece W is an O-ring-shape. Thus, the O-ring-shaped pressure sensor 10A can be interposed between the O-ring-shaped elastic body 9 and the tip of the nozzle 8. Thereby, while the elastic body 9 has contacted with the workpiece W, the pressure applied on the elastic body 9 from the workpiece W can be detected by the pressure sensor 10A.

When simplifying a structure of the pressure sensor 10A is preferred, the pressure sensor 10A which outputs a pressure having a single component applied on an annular area in the optical axis direction of the laser light L can be attached to the tip of the nozzle 8. In this case, whether the elastic body 9 has contacted with the surface of the workpiece W or not can be detected by threshold processing of a measured value of the pressure output from the pressure sensor 10A.

On the contrary, when it is preferred to detect whether the ring-shaped elastic body 9 has closely contacted with the surface of the workpiece W certainly, the pressure sensor 10A, which detects pressures applied on not less than three deferent points on the elastic body 9, can be attached to the tip of the nozzle 8. In this case, it becomes possible to detect whether the elastic body 9 has certainly contacted with the surface of the workpiece W, by threshold processing of measured values of the pressures at the not less than three points. Specifically, it can be determined that the elastic body 9 has certainly contacted with the surface of the workpiece W only when any of measured values of the pressures at the not less than three points on the elastic body 9 becomes not less than or more than a threshold value.

Therefore, the elastic body 9 is required to have characteristic for transmitting pressures to the pressure sensor 10A besides lubricity to the workpiece W and elasticity for being closely contacted with the surface of the workpiece W. In particular, it is important to secure lubricity between the elastic body 9 and the workpiece W since the surface of the workpiece W is washed before laser peening processing.

Examples of a material of the elastic body 9 which meets the above-mentioned requirements include polytetrafluoroethylene (PTFE), polyamide resin (nylon) and polyacetal resin. The elastic body 9 may be made of not only a single material but also a plurality of materials. That is, the elastic body 9 may be made of a laminated material derived by laminating a plurality of materials. Therefore, the elastic body 9 can be made of at least one of polytetrafluoroethylene, polyamide resin and polyacetal resin.

The output side of the sensor 10, such as the pressure sensor 10A, can be coupled to the control device 5 for controlling the power source 4. Then, the control device 5 can automatically determine a contact state between the elastic body 9 and the workpiece W, including whether the elastic body 9 has contacted with the workpiece W, or whether the whole of the ring-shaped elastic body 9 has closely contacted with the surface of the workpiece W.

Accordingly, the oscillation of the laser light L can be stopped by controlling the power source 4 of the laser oscillator 2 according to the contact state between the elastic body 9 and the workpiece W. Specifically, when it has been determined that the elastic body 9 is not in contact with the workpiece W, or when it has been determined that the elastic body 9 is not in close contact with the surface of the workpiece W completely, the power source 4 of the laser oscillator 2 can be automatically switched off so that a reflected light or a scattering light of the laser light L may not leak from a gap between the elastic body 9 and the workpiece W.

In that case, the control device 5 can be composed of electronic circuitry in which signal processing program, for determining the contact state between the elastic body 9 and the workpiece W based on a detection signal or detection signals output from the sensor 10 and generating a control signal for switching the power source 4 of the laser oscillator 2 off according to the determination result, has been installed.

As another example, a determination result of the contact state between the elastic body 9 and the workpiece W may only be displayed on a display or notified to a user of the laser peening processing apparatus 1 by voices or a lamp when the possibility that an accident happens immediately is low even if a gap arises between the elastic body 9 and the workpiece W, like a case where the nozzle 8 has been held by the robot arm.

Such safety measures using the sensor 10 can prevent the accident that a reflected light or a scattering light of the laser light L as well as the laser light L enters an eye of a person, more certainly.

When laser peening processing of the workpiece W is performed by irradiating the workpiece W with the laser light L, a part of the workpiece W becomes dust. When laser peening processing is performed in a liquid as in conventional methods, dust of a workpiece is removed by a flow of the liquid. On the contrary, in a case of laser peening processing for which no liquid is used, it is important to allow removal of dust of the workpiece W. In particular, when the optical path of the laser light L is closed by the nozzle 8, it is important to prevent dust of the workpiece W from remaining at a point to be processed in the nozzle 8 and causing interruption of the laser light L.

Thus, it is appropriate to collect dust of the workpiece W, arisen in the nozzle 8 due to the irradiation of the laser light L, with the dust collector 6. The dust collector 6 and the inside of the nozzle 8 can be coupled to each other through one or more coupling tubes 11. Each coupling tube 11 can be composed of a metal or rubber tube.

Figure 2:
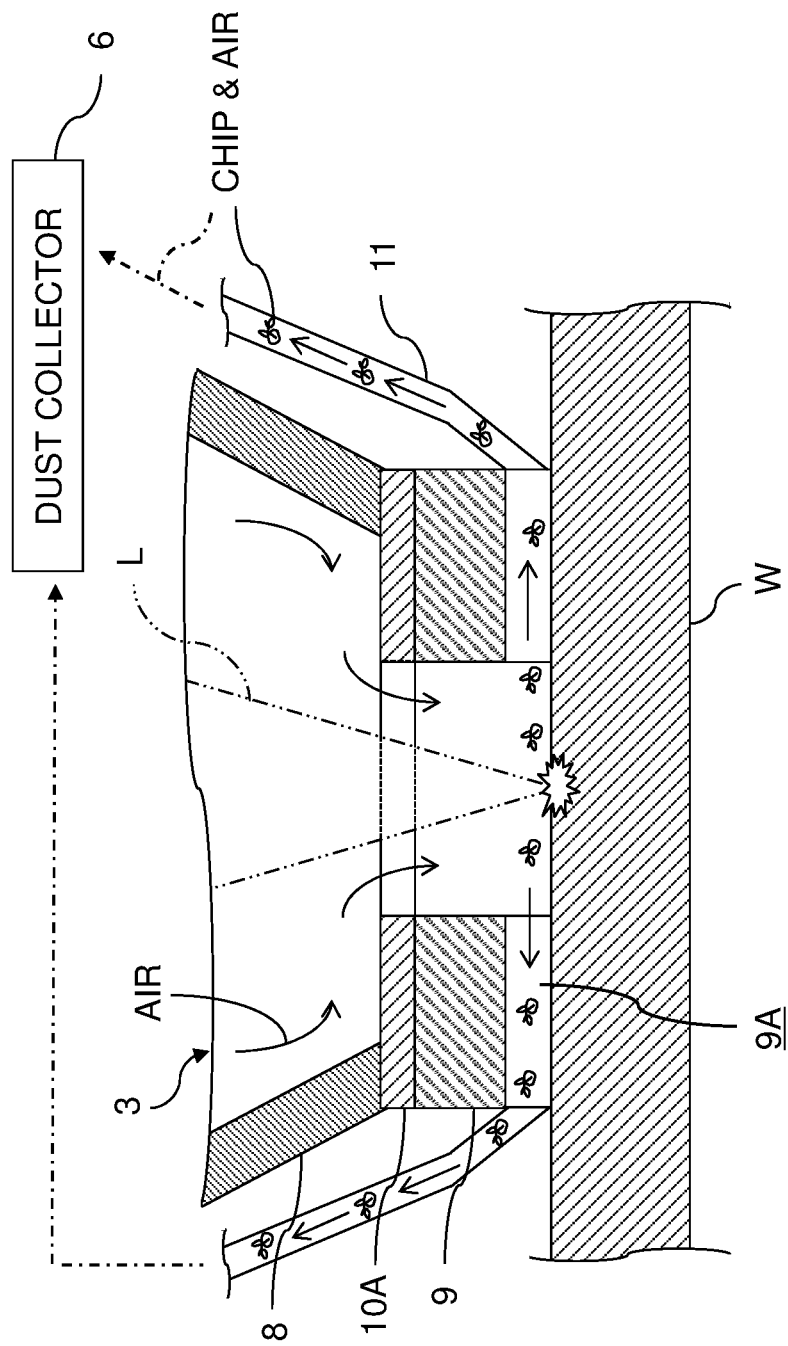
FIG. 2 is an enlarged sectional view at the tip part of the nozzle shown in FIG. 1.
Figure 3:
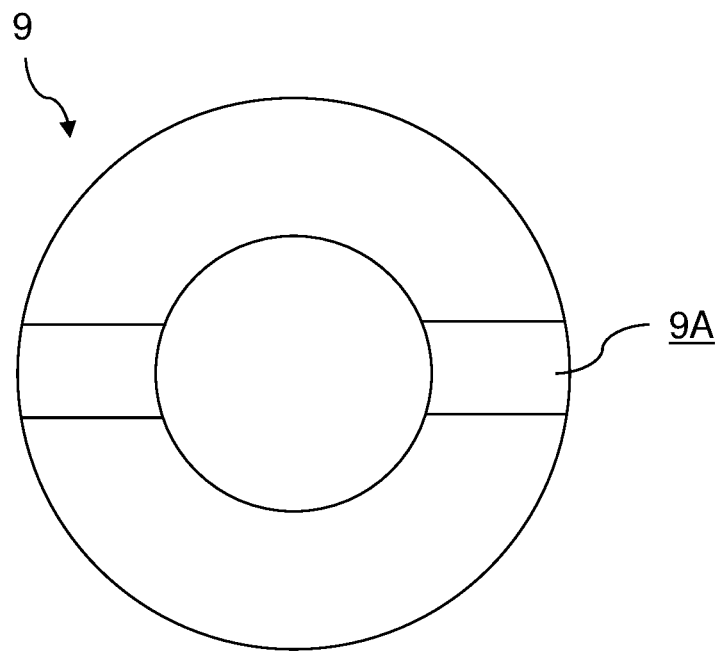
FIG. 3 is a bottom view of the elastic body shown in FIG. 2.

FIG. 2 is an enlarged sectional view at the tip part of the nozzle 8 shown in FIG. 1, and FIG. 3 is a bottom view of the elastic body 9 shown in FIG. 2.

It is desirable to prevent dust of the workpiece W, which may be an obstacle of the laser light L, from flying up inside the nozzle 8, from a viewpoint of irradiating the surface of the workpiece W with the laser light L having an appropriate intensity. Accordingly, each coupling tube 11 can be coupled to the elastic body 9 at a position close to the surface of the workpiece W as much as possible. For that purpose, at least one groove 9A for sucking dust of the workpiece W from the inside of the nozzle 8 can be formed in the workpiece W side of the elastic body 9. The length direction of each groove 9A formed in the elastic body 9 becomes a radial direction of the elastic body 9 since each groove 9A is made for connecting the inside of the nozzle 8 with the outside of the nozzle 8.

Then, the nozzle 8 side of the coupling tube 11 can be coupled to the groove 9A formed in the workpiece W side of the ring-shaped elastic body 9. For example, the tip of the coupling tube 11 can be bonded to the elastic body 9 with an adhesive when the coupling tube 11 is made of rubber. Alternatively, when the coupling tube 11 is made of metal, the tip of the coupling tube 11 may be coupled to the elastic body 9 with a bracket composed of screws and the like, for example.

In an illustrated example, the two grooves 9A have been formed in both sides of the elastic body 9 across the irradiation point of the laser light L. Therefore, the two grooves 9A of the elastic body 9 are coupled to the dust collector 6 through the two coupling tubes 11 respectively. Thus, it is preferable to form at least two grooves 9A at an equal interval on the elastic body 9, from a viewpoint of keeping dust of the workpiece W from passing near a processing point by laser peening processing. When the number of the grooves 9A of the elastic body 9 and the coupling tubes 11 is increased, the collection effect of dust of the workpiece W can be improved. Specifically, dust of the workpiece W generated at each processed point by laser peening processing can be radially sucked from the respective grooves 9A of the elastic body 9 by the dust collector 6 so as not to interfere with the optical path of the laser light L.

Figure 4:
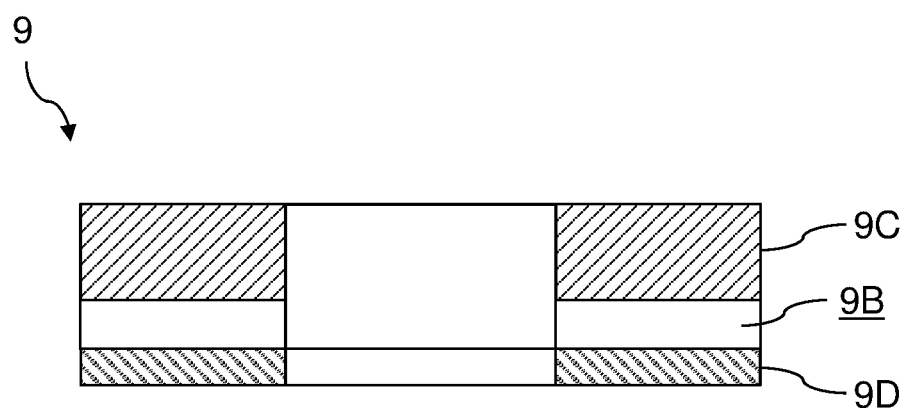
FIG. 4 is a front view showing another example of structure of the elastic body shown in FIGS. 1 to 3.

FIG. 4 is a front view showing another example of structure of the elastic body 9 shown in FIGS. 1 to 3.

The elastic body 9 may have one or more through holes 9B instead of the grooves 9A. For example, the elastic body 9 having the through holes 9B can be produced by forming grooves on a ring-shaped elastic layer 9C having an excellent elasticity and overlapping the elastic layer 9C with a ring-shaped lubrication layer 9D having an excellent lubricity as exemplified by FIG. 4. Then, the through holes 9B formed in the elastic body 9 can be coupled to the coupling tubes 11 respectively. As a matter of course, the through holes 9B may be formed in the single-layered elastic body 9, regardless of an example case shown in FIG. 4.

In order to keep dust of the workpiece W from remaining near a point to be processed by laser peening processing, it is desirable to form not only discharge ports of air for collecting dust of the workpiece W but intake ports of the dust-collecting air at appropriate positions. Specifically, it is desirable to form flows of dust-collecting air directed towards the coupling tubes 11 without crossing a point to be processed by laser peening processing, in the nozzle 8.

Thus, it is appropriate to form at least one air intake port 8A, for taking the air for collecting dust into the inside of the nozzle 8, in the workpiece W side of the lens 7 inside the nozzle 8. In addition, it is desirable to form the air intake port 8A, which has a structure for preventing scattering lights of the laser light L from leaking to the outside of the nozzle 8, in the nozzle 8, from a viewpoint of prevention of an accident.

Figure 5:
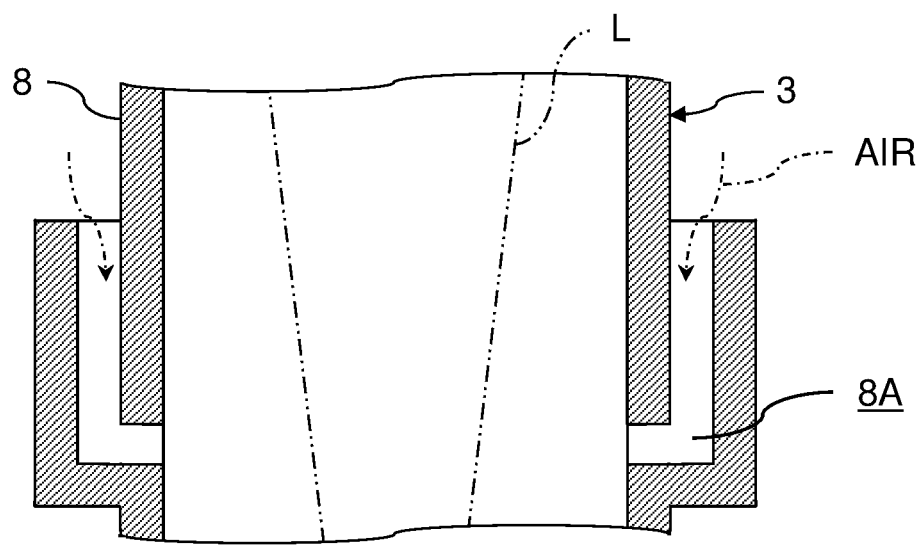
FIG. 5 is an enlarged sectional view showing a structure of the air intake port shown in FIG. 1.
Figure 6:
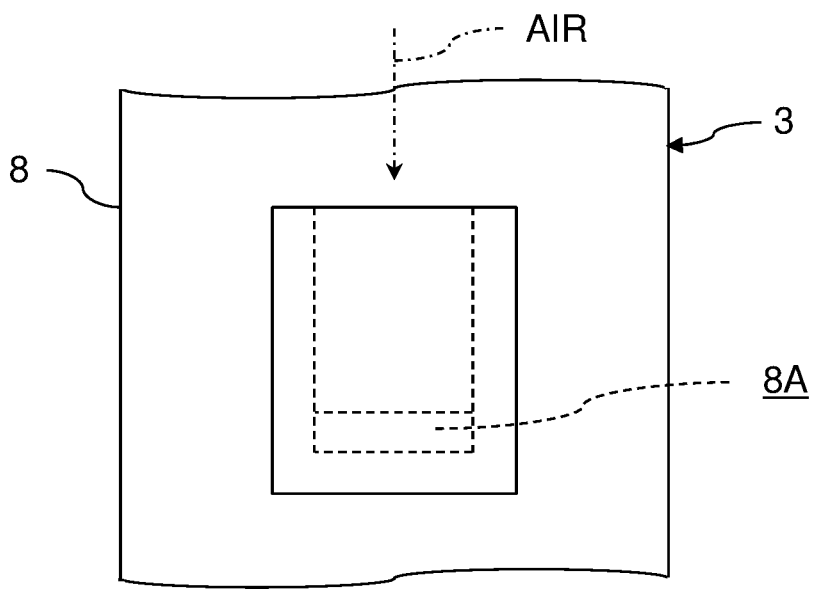
FIG. 6 is a right side view of the air intake port shown in FIG. 4.

FIG. 5 is an enlarged sectional view showing a structure of the air intake port 8A shown in FIG. 1, and FIG. 6 is a right side view of the air intake port 8A shown in FIG. 4.

As shown in FIG. 5 and FIG. 6, each air intake port 8A can have a structure in which the laser light L cannot be linearly connect with the outside of the nozzle 8 through the air intake port 8A, for example. Specifically, each air intake port 8A can be formed by wall surfaces doubly disposed with a clearance in a direction perpendicular to the optical axis of the laser light L. Besides an example shown in FIG. 5 and FIG. 6, each air intake port 8A can also be formed by two wall surfaces slanted relative to the optical axis of the laser light L.

Besides, the nozzle 8 may be designed to be a cylindrical shape so that the central axis of the nozzle 8 may be shifted from the optical axis of the laser light L. That is, the nozzle 8 may be made eccentric. Then, vortex of the air for collecting dust can be formed in the nozzle 8, and the center of the vortex can be shifted from a point to be processed by laser peening processing. Thereby, dust of the workpiece W can be sucked from each groove 9A or each through hole 9B formed in the elastic body 9, by the dust collector 6, without remaining at a point to be processed by laser peening processing.

Then, a product or a semi-product can be produced by laser peening processing of the workpiece W using the laser peening processing apparatus 1 which has the above-mentioned configuration.

(Effects)

As described above, the laser peening processing apparatus 1 and the laser peening processing method can make a medium, such as a liquid or a coating, unnecessary by using an ultrashort pulsed-laser, such as a femtosecond laser. Therefore, according to the laser peening processing apparatus 1 and the laser peening processing method, a size of the laser oscillator 2 can be remarkably made small compared with a case of using a nanosecond laser. As a result, the laser peening processing apparatus 1 can be made portable.

Moreover, the laser peening processing apparatus 1 and the laser peening processing method can shade the laser light L and collect dust of the workpiece W in order to respectively avoid leakage of a light having a high intensity and retention of dust of the workpiece W, which are considered as negative effects caused by use of an ultrashort pulsed-laser and use of no liquid respectively. In particular, it becomes possible to avoid damage of the workpiece W and leakage of the laser light L, scattering lights and reflected lights, by attaching the elastic body 9 to the tip of the nozzle 8. Furthermore, dust of the workpiece W can be collected from each groove 9A or each through hole 9B formed in the elastic body 9. As a result, blockage of the laser light L by dust can be avoided and laser peening processing of the workpiece W can be performed under satisfactory conditions.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A laser peening processing apparatus comprising:
   a laser oscillator that oscillates a laser light; and
   an irradiation system, including at least a lens, that condenses the laser light with the lens and irradiates a workpiece with the condensed laser light;
   wherein the irradiation system irradiates the workpiece with the laser light in a state where the workpiece has been exposed in an atmosphere without interposed liquid,
   wherein the irradiation system further includes:
      a nozzle comprising a light shielding material for shielding scattering lights of the laser light, the nozzle being coupled to the laser oscillator; and
      an elastic body that is contacted to the workpiece and attached to the nozzle.

2. The laser peening processing apparatus according to claim 1,
   wherein the laser oscillator is a femtosecond laser oscillator that oscillates a femtosecond laser light.

3. A laser peening processing apparatus comprising:
   a laser oscillator that oscillates a laser light; and
   an irradiation system, including at least a lens, that condenses the laser light with the lens and irradiates a workpiece with the condensed laser light;
   wherein the irradiation system irradiates the workpiece with the laser light in a state where the workpiece has been exposed in an atmosphere without interposed liquid,
   wherein the irradiation system further includes:
      a tubular nozzle made of a light shielding material for shielding scattering lights of the laser light, one open end of the tubular nozzle being coupled to the laser oscillator; and
      an elastic body that is contacted to and slid on a surface of the workpiece, the elastic body attached to another open end of the tubular nozzle.

4. The laser peening processing apparatus according to claim 3, further comprising:
   a sensor that detects a contact state of the elastic body with the workpiece; and
   control circuitry that stops an oscillation of the laser light by controlling a power source of the laser oscillator according to the contact state.

5. The laser peening processing apparatus according to claim 1, further comprising:
   a dust collector that collects dust of the workpiece, arisen due to irradiating the laser light.

6. The laser peening processing apparatus according to claim 3, further comprising:
   a dust collector that collects dust of the workpiece, arisen in the tubular nozzle due to irradiating the laser light; and
   a coupling tube that couples the dust collector to an inside of the tubular nozzle;
   wherein a tubular nozzle side of the coupling tube is coupled to a groove formed on a workpiece side of the ring-shaped elastic body or a through hole formed in the elastic body.

7. The laser peening processing apparatus according to claim 6,
   wherein the tubular nozzle has an air intake port that takes air, for collecting the dust, into the tubular nozzle, the air intake port having a structure which prevents the scattering lights of the laser light from leaking outside the tubular nozzle.

8. The laser peening processing apparatus according to claim 1,
wherein the elastic body comprises at least one of polytetrafluoroethylene, polyamide resin and polyacetal resin.

9. A laser peening processing method comprising:
producing a product or a semi-product by laser peening processing of the workpiece using the laser peening processing apparatus according to claim 1.

10. A laser peening processing apparatus comprising:
a laser oscillator that oscillates a laser light; and
an irradiation system, including at least a lens, that condenses the laser light with the lens and irradiates a workpiece with the condensed laser light;
wherein the irradiation system irradiates the workpiece with the laser light in a state where the workpiece has been exposed in an atmosphere without interposed liquid,
wherein the laser oscillator is a femtosecond laser oscillator that oscillates a femtosecond laser light
wherein the irradiation system includes:
a tubular nozzle made of a light shielding material for shielding scattering lights of the laser light, one open end of the tubular nozzle being coupled to the laser oscillator; and
an elastic body that is contacted to and slid on a surface of the workpiece, the elastic body attached to another open end of the tubular nozzle.

11. The laser peening processing apparatus according to claim 10, further comprising:
a sensor that detects a contact state of the elastic body with the workpiece; and
control circuitry that stops an oscillation of the laser light by controlling a power source of the laser oscillator according to the contact state.

12. The laser peening processing apparatus according to claim 2, further comprising:
a dust collector that collects dust of the workpiece, arisen due to irradiating the laser light.

13. The laser peening processing apparatus according to claim 3, further comprising:
a dust collector that collects dust of the workpiece, arisen due to irradiating the laser light.

14. A laser peening processing method comprising:
producing a product or a semi-product by laser peening processing of the workpiece using the laser peening processing apparatus according to claim 2.

15. A laser peening processing method comprising:
producing a product or a semi-product by laser peening processing of the workpiece using the laser peening processing apparatus according to claim 3.

16. A laser peening processing method comprising:
producing a product or a semi-product by laser peening processing of the workpiece using the laser peening processing apparatus according to claim 4.

17. A laser peening processing method comprising:
producing a product or a semi-product by laser peening processing of the workpiece using the laser peening processing apparatus according to claim 5.

18. A laser peening processing method comprising:
producing a product or a semi-product by laser peening processing of the workpiece using the laser peening processing apparatus according to claim 6.

19. A laser peening processing method comprising:
producing a product or a semi-product by laser peening processing of the workpiece using the laser peening processing apparatus according to claim 7.

20. A laser peening processing method comprising:
producing a product or a semi-product by laser peening processing of the workpiece using the laser peening processing apparatus according to claim 8.

* * * * *